United States Patent [19]

Breuer

[11] 3,783,307

[45] Jan. 1, 1974

[54] ANALOG TRANSMISSION GATE

[75] Inventor: David R. Breuer, Malibu, Calif.

[73] Assignee: TRW Inc., Redondo Beach, Calif.

[22] Filed: Jan. 3, 1972

[21] Appl. No.: 214,903

[52] U.S. Cl. .................. 307/243, 307/244, 328/150, 328/153, 328/154, 330/30 D

[51] Int. Cl. ....................... H03k 17/30, H03k 17/60

[58] Field of Search .................... 307/232, 241, 242, 307/243, 244, 218, 299 A, 213; 328/104, 105, 150, 153, 154; 330/30 D, 69

[56] References Cited

UNITED STATES PATENTS

| | | | |
|---|---|---|---|
| 3,522,450 | 8/1970 | Muenter | 307/241 X |
| 3,351,782 | 11/1967 | Narud et al. | 307/213 |
| 3,539,831 | 11/1970 | Gilbert | 307/235 R |
| 3,614,478 | 10/1971 | Schiff | 330/30 D X |
| 3,719,830 | 3/1973 | Ananiades | 307/299 X |
| 3,518,458 | 6/1970 | Camenzind | 307/299 A X |

FOREIGN PATENTS OR APPLICATIONS

| | | | |
|---|---|---|---|
| 1,100,262 | 1/1968 | Great Britain | 307/299 A |

*Primary Examiner*—John S. Heyman
*Assistant Examiner*—L. N. Anagnos
*Attorney*—Daniel T. Anderson et al.

[57] ABSTRACT

A transistor switching network, responding to a logic input, switches current selectively into one of a number of nodes, each node connecting a pair of bipolar transistors coupled differentially in a unity gain amplifier circuit. From a number of analog input signals applied to the differentially connected transistor pairs, only the one coupled to the selected node will produce an output from the voltage follower circuit. Conversely, a single analog input signal may be gated selectively to any one of a number of output terminals.

8 Claims, 2 Drawing Figures

ANALOG TRANSMISSION GATE

BACKGROUND OF THE INVENTION

1. Field of the Invention

This invention relates to a high speed analog transmission gate, such as a multiplexer or a demultiplexer capable of fabrication in integrated circuit form. More particularly, in its multiplexing form, it relates to a circuit in which a plurality of analog voltages connected to a plurality of input terminals can be commutated at a rate as high as 100 MHz to time share a single output terminal.

2. Description of the Prior Art

Analog multiplexing and demultiplexing circuits of intregrated form are known which use field effect transistors to provide the switching function. However, field effect transistors are not capable of attaining the speeds of bipolar devices, and the speed of such circuits utilizing field effect transistors is generally limited to the range of 5 to 10 MHz.

Other multiplexing and demultiplexing circuits presently is use utilize a plurality of transistors or diodes in diamond bridge circuit to provide the commutation function. Although the speed is high, such circuits are either unduly complex or, to avoid complexity, must employ transformers, which of course, cannot be integrated.

SUMMARY OF THE INVENTION

According to one embodiment of the invention which is realized in its multiplexing form, a plurality of analog input voltages are applied to a like plurality of the input terminals of unity gain voltage follower circuits. The voltage follower circuits include a plurality of pairs of bipolar transistors coupled together differentially in each pair and with each pair in parallel with the other pairs. Each input terminal is connected separately to one transistor of each pair and the other transistors of each pair are connected to a common output terminal. Each transistor pair has an emitter node point, and all the node points are gated, one at a time, through a bipolar transistor switching network to receive current from a constant current source. Only the input signal that is coupled to a differential pair with a selected node point is reproduced in the output of the voltage follower circuit.

DESCRIPTION OF THE PREFERRED EMBODIMENTS

Inasmuch as the principles of the invention are applicable to both multiplexing and demultiplexing circuits, the term analog transmission gate is used herein as a generic expression to include both a circuit which functions as a multiplexer and a circuit which functions as a demultiplexer. A multiplexer is a circuit wherein a plurality of input signals applied to a plurality of input terminals are time gated to appear at a common output terminal. A demultiplexer is a circuit wherein an input signal applied to a single input terminal is time gated to appear at any selected one of a plurality of output terminals.

Figure 1:
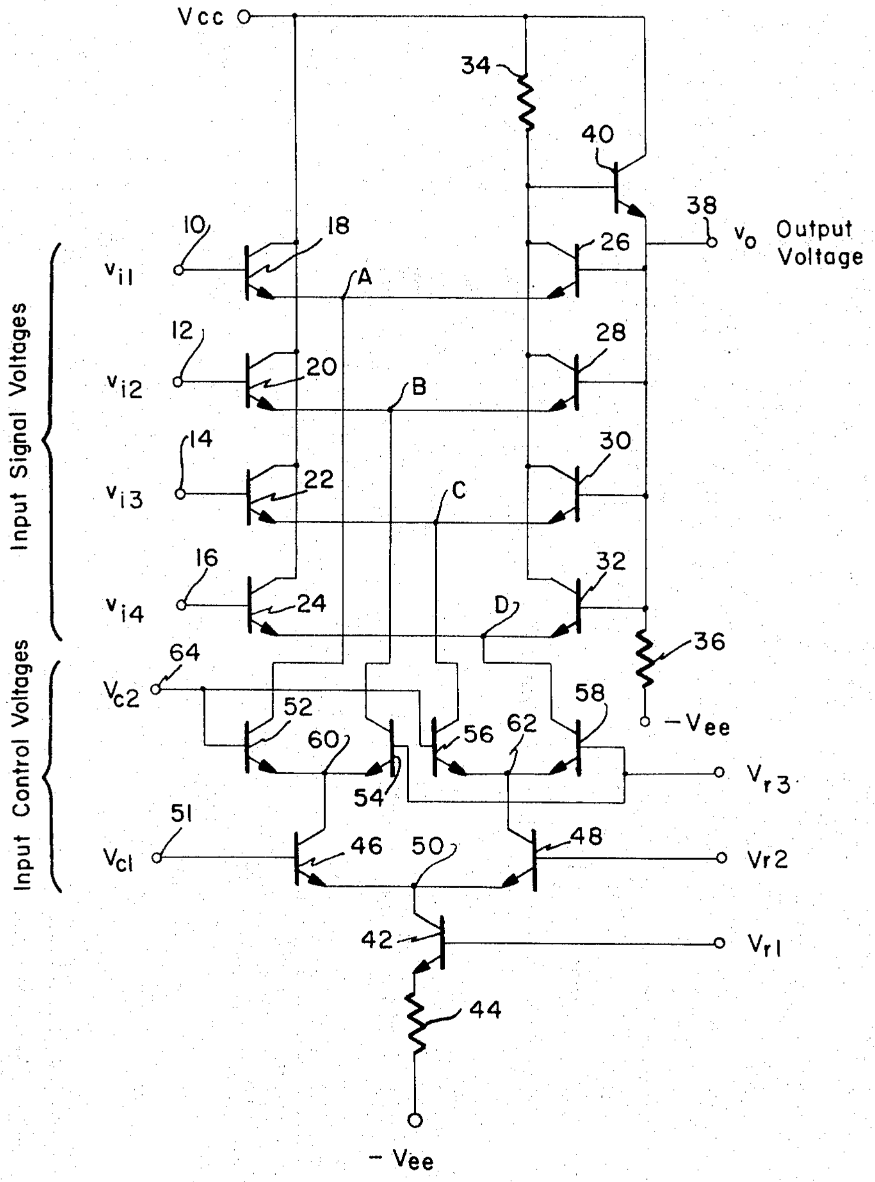
FIG. 1 is a schematic circuit illustrating a high speed multiplexer according to the invention.

Referring now to the multiplexing circuit shown in FIG. 1, a plurality of analog input voltage $v_{i1}$, $v_{i2}$, $v_{i3}$, and $v_{i4}$ are applied to input terminals 10, 12, 14, 16 respectively. The input terminals 10 to 16 are connected to the bases of a first set of bipolar transistors 18, 20, 22, 24. The collectors of the transistors 18–24 are connected together and to a positive voltage supply $V_{cc}$.

A second set of bipolar transistors 26, 28, 30, 32 have their collectors connected together and to one side of a load resistor 34 that is in series with the positive voltage supply $V_{cc}$. The two sets of transistors have their emitters connected in pairs, such that the emitters of transistors 18 and 26 are connected together at a first node point A, the emitters of transistors 20 and 28 are connected together at a second node point B, the emitters of transistors 22 and 30 are connected together at a node point C, and the emitters of transistors 24 and 32 are connected together at a node point D. The two sets of transistors are said to be coupled differentially.

The bases of the second set of transistors 26–32 are connected together and to one side of a load resistor 36 that is in series with a negative voltage supply ($-V_{ee}$). The bases of the second set of transistors 26–32 are also connected to an output terminal 38. A bipolar emitter follower feedback transistor 40 has its emitter connected to the output terminal 38 and its base connected in common with the collectors of the second set of transistors 26–32.

When any one of the node points A-D is fed constant current from a source to be described, the circuit including the differentially coupled transistor pair sharing the selected node point and the feedback transistor 40 constitutes a unity gain voltage follower circuit. Thus there are four voltage follower circuits connected in parallel having four separate input terminals 10–16 for receiving four different analog input signals simultaneously and having a single output terminal 38 where an output voltage $v_o$ is produced that is a replica of only one of the input analog voltages that is coupled through a selected node point.

The commutating circuit for selecting the node points one at a time will now be described. A source of constant current is formed by a bipolar transistor 42, the emitter 42, the emitter of which is in series with an emitter resistor 44 and a negative voltage supply ($-V_{ee}$) and the base of which is connected to a fixed positive reference voltage $V_{r1}$. The transistor 42 is in series with a pair of differentially connected bipolar transistors 46 and 48, and to this end the connector of the transistor 42 shares a common connection 50 with the emitters of the transistor pair 46 an 48. The base of one transistor 46 of the differentially connected pair is connected to an input control terminal 51 to which a logic input control voltage $V_{c1}$ is applied. The base of the other transistor 48 of the differentially connected pair is connected to a second fixed positive reference voltage $V_{r2}$.

Each one of the transistor pair 46 and 48 is connected in series with a different pair of differentially connected bipolar transistors. Thus one transistor 46 is connected in series with a pair of differentially connected bipolar transistors 52 and 54, and the other transistor 48 is connected in series with another pair of differentially connected bipolar transistors 56 and 58. The collector of transistor 46 shares a common 60 with the emitters of transistors 52 and 54, and the collector of transistor 48 shares a common connection 62 with the emitters of transistors 56 and 58.

The bases of transistors 54 and 58 are connected together and to a third fixed positive reference voltage $V_{r3}$. The base of transistors 52 and 56 are connected together and to an input control terminal 64 to which a logic input control voltage $V_{c2}$ is applied. The collectors of the transistors 52, 54, 56, 58 are connected respectively to the node points A, B, C, D.

A description will now be given to the operation of the commutating circuit in gating the analog voltages $v_{i1}$, $v_{i2}$, $v_{i3}$, and $v_{i4}$ one at a time for transmission to the output terminal 38. Each of logic input voltages $V_{c1}$ and $V_{c2}$ is assumed to be either HIGH or LOW. Logic input voltages $V_{c1}$ is HIGH when it is greater than fixed reference voltage $V_{r2}$, and $V_{cl}$is LOW when it is less than $V_{r2}$. Similarly, logic input voltage $V_{c2}$ is HIGH when it is greater than fixed reference voltage $V_{r3}$, and $V_{c2}$ is LOW when it is less than $V_{r3}$. The logic voltage $V_{c1}$ and $V_{c2}$ can exist in either one of four different logic states. In one state both $V_{c1}$ and $V_{c2}$ can be HIGH. In a second state both $V_{c1}$ and $V_{c2}$ can be LOW. In a third state $V_{c1}$ can be HIGH and $V_{c2}$ LOW. In a fourth state $V_{c1}$ can be LOW and $V_{c2}$ HIGH.

First, let it be assumed that both $V_{cl}$and $V_{c2}$ are HIGH. Tracing the flow of constant current from the constant current source including transistor 42 and resistor 44 in series with negative voltage supply $-V_{ee}$, it will be seen that current appearing at connection 50 will be blocked from transistor 48, because it is OFF, and the current will be diverted through transistor 46 to connection 60. At connection 60, the current will be blocked from transistor 54 and will be diverted through transistor 52 to node point A. At node point A, the current will feed both differentially connected transistors 18 and 26, thereby connecting the unity gain voltage follower circuit for transmission of only analog input signal voltage $v_{i1}$, the latter appearing at output terminal 38 as the output voltage $v_o = v_{i1}$.

Second, assume that $V_{c1}$ and $V_{c2}$ are both LOW. That mean that both reference voltage $V_{r2}$ and $V_{r3}$ are higher than $V_{c1}$ and $V_{c2}$. The constant current from the constant current source appearing at connection 50 will be blocked from transistor 46, which is OFF, and will be diverted through transistor 48, which is ON, to connection 62. At connection 62, the current will be blocked from transistor 56, which is OFF, and will be diverted through transistor 58, which is ON, to node point D. At node point D, the current will feed both differentially connected transistors 24 and 32, thereby connecting the unity gain voltage follower circuit for transmission of only analog input signal voltage $v_{i4}$. At output terminal 38, the output voltage $v_o$ will be equal to $v_{i4}$.

Third, assume that $V_{cl}$ is HIGH and $V_{c2}$ is LOW. It will be seen that the constant current will flow only through transistors 46 and 54 to node point B. Current feeding node point B will cause input analog voltage $v_{i2}$ to appear in the output; that is, $v_o = v_{i2}$ .

Fourth, and lastly, assume that $V_{c1}$ is LOW and $V_{c2}$ is HIGH. Now it will be seen that constant current is diverted through transistors 48 and 56 to node point C. Current feeding node point C will cause analog input voltage $v_{i3}$ to appear in the output, so that $v_o = V_{i3}$.

It is now apparent that in response to a selected one of a plurality of input control logic signals, only one of a like plurality of analog input signal voltages is permitted to appear at a single output terminal 38.

The principles of the invention may also be used to produce a demultiplexer circuit; that is, a circuit in which a single input signal is time gated to appear at a selected one of a plurality of output terminals. Referring now to the demultiplexer circuit of FIG. 2, wherein like numerals refer to like parts of the circuit of FIG. 1, a single input terminal 70 receives an analog input signal $v_i$ and transmits it to the base of the four-emitter coalesced transistor 72. The transistor 72 has four separate emitters, a single base, and a single collector, and is the equivalent of four transistors having common base and common collector connections but separate emitters connections.

The collector of transistor 72 is connected to positive supply voltage $V_{cc}$. The emitters are individually connected to separate node points A, B, C, D, which in turn are connected indivually to the emitters of four transistors 74, 76, 78, 80, respectively. For convenience, each of the emitters of the four-emitter coalesced transistor 72 is labeled with a different numeral to identify it as a separate transistor, the identifying emitters being labeled 82, 84, 86, 88. Thus, each pair of transistors having emitters sharing a common node point is differentially connected, such as, for example, transistors 82 and 74 sharing a common emitter connection at node point A.

Each of the transistors 74–80 has a load resistor connected between its collector and the supply voltage $V_{cc}$, the four load resistors being labeled 90, 92, 94, 96. An emitter follower feedback circuit is connected in the collector base circuit of each of the transistors 74–80. Each emitter follower includes a transistor, such as one of the four transistors 98, 100, 102, 104, and a pull down resistor, such as one of the four resistors 106, 108, 110, 112. Thus, for example, the base of emitter follower transistor 98 is connected to the collector of transistor 74; the collector of emitter follower transistor 98 is connected to the positive supply voltage $V_{cc}$; the emitter of emitter follower transistor 98 is connected in common with the base of transistor 74, with one end of pull down resistor 106 and with an output terminal 114; and the other end of pull down resistor 106 is connected to negative supply voltage $-V_{ee}$. The other three emitter follower circuits are similarily connected and their output terminals are labeled 116, 118, and 120.

A commutating or transistor switching circuit similar to that of FIG. 1 is used to direct a constant current into one of the four node points, A, B, C, or D.

Figure 2:
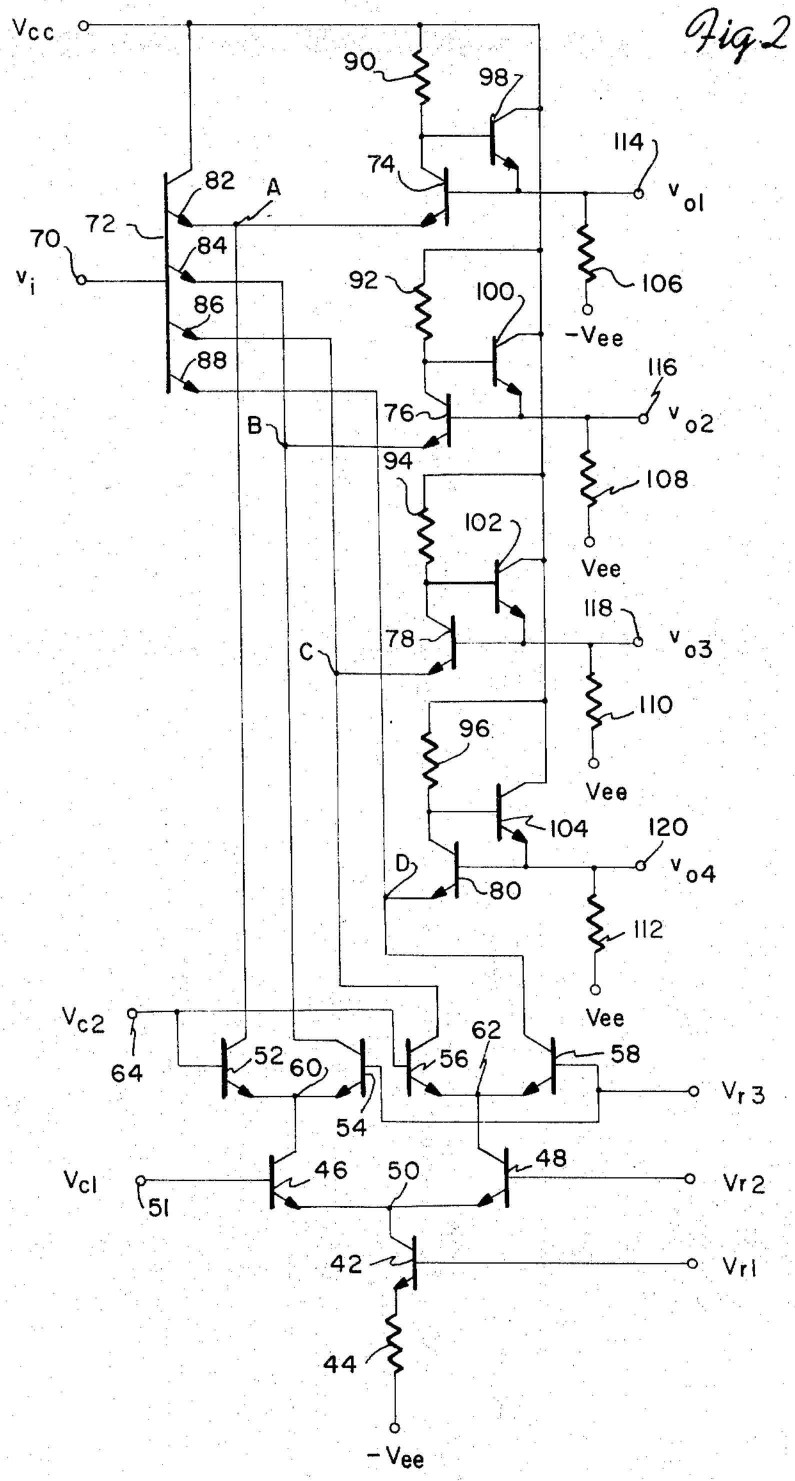
FIG. 2 is a schematic circuit illustrating one form of a high speed demultiplexer according to the invention.

In the operation of the demultiplexer circuit of FIG. 2, an input analog voltage $v_i$ applied to the base of the four emitter coalesced transistor 72 will pass the input signal through either one of the four emitters 82, 84, 86, or 88 to the corresponding node point A, B, C, or D, depending upon which one of the node points is selected by the transistor switching circuit to receive current from the constant current source. Thus, if node A is selected for current injection, current will feed to transistor 72 through emitter 82 and to transistor 74. In a manner similar to that described in connection with the circuit of FIG. 1, the unity gain amplifier circuit will reproduce the input voltage $v_i$ as an output voltage $v_{ol}$ at the output terminal 114.

At the other node points, say node pont B, the transistor 76 is OFF, no current flows in the collector-base circuit through resistor 92 and thus the base of transistor 100 rises to high voltage equal to the positive supply voltage $V_{cc}$. The emitter of transistor 100 follows the base voltage and thus the output voltage $v_{o2}$ at the output terminal 116 is high dc voltage. Similarly, the output voltages $v_{o3}$ and $v_{o4}$ at the other two output terminals 118 and 120 are high dc voltages.

Thus, the input voltage $v_i$ is reproduced at only that one of the output terminals 114, 116, 118, or 120, that is coupled to the selected node point A, B, C, or D respectively.

Both the multiplexer circuit of FIG. 1 and the demultiplexer circuit of FIG. 2 are unilateral devices. That is, signal flow through the circuit occurs in one direction only. As a consequence, the ratio of input impedance to output impedance is very high and can be as high as 1,000:1. This contrasts with the bilateral characteristics of most conventional multiplexers and demultiplexers in which signal flow can occur in both directions and which therefore exhibit a low ratio of input inpedance to output impedance of approximately 1:1. An important result accruing from the circuit according to the invention is the fact that it prevents injection of noise from the output to the input terminals. A subsidiary advantage is the isolation provided between input signals in a multiplexer.

What is claimed is:

1. An analog transision gate, comprising:

a unity gain amplifier circuit including a plurality of pairs of transistors, with the transistors of each pair connected directly together differentially without any intervening elements at a separate node point, each of said transistors having an input circuit and an output circuit, and a feedback loop between the output and input circuits of one of the transistors of each pair;

a plurality of signal terminals on one side of said amplifier circuit and only one signal terminal on the other side of said amplifier circuit; and replaced with a constant current means including a commutating circuit means and a single constant current source in which said commutating circuit means is coupled between said constant current source and said node points for feeding current from said constant current source; to each of said node points selectively one at a time so that at any one time the signal appearing at said one signal terminal is the same as the signal appearing at only the one of the plurality of signal terminals that is coupled to the amplifier circuit through the selected node point.

2. The invention according to claim 1, wherein said plurality of signal terminals are located at the input side of said amplifier circuit and said only one signal terminal is located at the output side thereof.

13. The invention according to claim 2 and comprising further:

said plurality of pairs of transistors comprise a first set of transistors and a second set of transistors;

in said first set of transistors the collectors thereof are connected in common with a first junction, and each base is connected to a separate input signal terminal;

in said second set of transistors, the collectors are connected in common with a second junction, and the bases are connected in common with a single output signal terminal;

each of said node points forming a common connection between the emitter of one transistor from said first set and the emitter of one transistor from said second set;

a positive voltage supply connected to said first junction;

a resistor connected between said first and second junctions;

a negative voltage supply;

a resistor connected between said negative voltage supply and said output signal terminal; and an additional transistor forming an emitter follower and having its base connected to said second junction, its collector connected to said first junction, and its emitter connected to said output signal terminal.

4. The invention according to claim 1, wherein said commutating circuit means includes:

a transistor switching circuit connected between said constant current source and said node points and selectively responsive to distinct logic input signals to conduct said constant current to each one of said node points selectively as determined by a different logic input signal.

5. The invention according to claim 1, wherein said commutating circuit means comprises:

A plurality of stages of differentially connected transistor circuits, each stage of which includes a pair of transistors having their emitters connected directly in common to form a current input terminal for receiving current from said constant current source, one transistor of each pair having its base serving as a control terminal for receiving a logic input signal voltage, the other transistor of each pair having its base connected to a potential other than said logic input signal voltage, the first stage of said differential connected transistor pairs having their collectors connected separately to common emitter input terminal of a succeeding stage, and the final stages of said differentially connected transistor pairs having their collectors connected separately to a different one of said node points.

6. An analog transmission gate, comprising:

a unity gain amplifier circuit including a plurality of pairs of transistors, with the transistors of each pair connected directly together differentially at a separate node point, each of said transistors having an input circuit and an output circuit, and a feedback loop between the output and input circuits of one of the transistors of each pair;

a plurality of signal terminals on the output side of said amplifier circuit and only one signal terminal on the input side of said amplifier circuit; and means for feeding a constant current to each of said node points selectively one at a time so that at any one time the signal appearing at said one signal terminal is the same as the signal appearing at only the one of the plurality of signal terminals that is coupled to the amplifier circuit through the selected node point.

7. The invention according to claim 3, and comprising further:

said plurality of pairs of transistors comprise a first set of transistors and a second set of transistors;

in said first set of transistors, the bases thereof are connected in common and to a single input signal terminal, and the collectors thereof are connected in common with a first junction;

a positive voltage supply connected to said first junction;

in said second set of transistors, each base is connected to a separate one of said plurality of output signal terminals;

each of said node points forming a common connection between the emitter of one transistor from said first set and the emitter of one transistor from said second set;

a plurality of resistors, one for each transistor of said second set connected between the collector thereof and said first junction;

a plurality of additional transistors, one in the collector-base circuit of each transistor of said second set and forming an emitter-follower therewith, each additional transistor having its base connected to the collector of the respective transistor of said second set, its emitter connected to a separate one of said plurality of output signal terminals and its collector connected to said first junction;

a negative voltage supply; and a plurality of pull down resistors, one for each of said additional transistors connected between said negative voltage supply and a separate one of said plurality of output signal terminals.

8. The invention according to claim 5, wherein said first set of transistors is formed by a multiple emitter coalesced transistor having a common base and a common collector.

* * * * *

UNITED STATES PATENT OFFICE

CERTIFICATE OF CORRECTION

Patent No. 3,783,307 Dated January 1, 1974

Inventor(s) David R. Breuer

It is certified that error appears in the above-identified patent and that said Letters Patent are hereby corrected as shown below:

Column 2, line 2 change "voltage" to --voltages-- line 2 change "$v_{13}$" to --$v_{i3}$-- line 45 delete "the emitter 42,"

line 50 change "connector" to --collector-- line 66 after "common" insert --connection--

Column 3, line 19 change "voltage" to --voltages-- line 42 change "mean" to --means-- line 42 change "voltage" to --voltages--

Column 4, line 66 change "pont" to --point--

Column 5, lines 40 and 41 delete "and replaced with"

line 46 delete ";"

line 56 change "13." to --3.--

Signed and sealed this 14th day of May 1974.

(SEAL)
Attest:

EDWARD M.FLETCHER,JR.
Attesting Officer

C. MARSHALL DANN
Commissioner of Patents